(12) United States Patent
Sunagawa et al.

(10) Patent No.: US 10,635,897 B2
(45) Date of Patent: Apr. 28, 2020

(54) DOCUMENT UNDERSTANDING SUPPORT APPARATUS, DOCUMENT UNDERSTANDING SUPPORT METHOD, NON-TRANSITORY STORAGE MEDIUM

(71) Applicant: Kabushiki Kaisha Toshiba, Tokyo (JP)

(72) Inventors: Eiichi Sunagawa, Ota Tokyo (JP); Shinichi Nagano, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 78 days.

(21) Appl. No.: 15/912,756

(22) Filed: Apr. 4, 2018

(65) Prior Publication Data

US 2019/0122042 A1     Apr. 25, 2019

(30) Foreign Application Priority Data

Oct. 25, 2017   (JP) ................................ 2017-206194

(51) Int. Cl.
*G06K 9/00*          (2006.01)
*G06F 17/27*         (2006.01)
(Continued)

(52) U.S. Cl.
CPC ....... *G06K 9/00456* (2013.01); *G06F 16/322* (2019.01); *G06F 17/277* (2013.01);
(Continued)

(58) Field of Classification Search
CPC .............. G06K 9/00456; G06K 9/6201; G06F 16/322; G06F 17/2755; G06F 17/277; G06F 17/279; G06F 9/6201; G06F 9/72
See application file for complete search history.

(56) References Cited

U.S. PATENT DOCUMENTS 5,905,980 A *  5/1999  Masuichi .............. G06F 16/313
                                                     707/700
6,631,373 B1 * 10/2003 Otani ...................... G06F 16/81
(Continued)

FOREIGN PATENT DOCUMENTS

JP       2007-193500 A      8/2007
JP       2008-310635 A     12/2008
(Continued)

OTHER PUBLICATIONS

Mining product reputations on the Web (Year: 2002).*
Extracting semantic representations from word co-occurrence statistics: A computational study (Year: 2007).*

*Primary Examiner* — Mohammad K Islam
(74) *Attorney, Agent, or Firm* — Finnegan, Henderson, Farabow, Garrett & Dunner, L.L.P.

(57) ABSTRACT

A document understanding support apparatus as one embodiment of the present invention includes a word extraction condition learning device, a word extractor, a word relationship extraction condition learning device, a word relationship extractor, and an output device. The word extraction condition learning device creates a word extraction condition for extracting words from a target electronic document by machine-learning based on feature values assigned to respective words. The word extractor extracts words satisfying the word extraction condition. The word relationship extraction condition learning device creates a word relationship extraction condition for extracting word relationships from the target electronic document by machine-learning based on feature values with respect to extraction target word relationships. The word relationship extractor extracts a word relationship satisfying the word relationship extraction condition. The output device outputs at least either the extracted words or the extracted word relationship.

10 Claims, 19 Drawing Sheets

(51) Int. Cl.
*G06K 9/62* (2006.01)
*G06K 9/72* (2006.01)
*G06F 16/31* (2019.01)

(52) U.S. Cl.
CPC ........ *G06F 17/279* (2013.01); *G06F 17/2755* (2013.01); *G06K 9/6201* (2013.01); *G06K 9/6217* (2013.01); *G06K 9/72* (2013.01)

(56) References Cited

U.S. PATENT DOCUMENTS

| | | | | |
|---|---|---|---|---|
| 7,813,915 | B2* | 10/2010 | Nakao | G06F 17/2745 |
| | | | | 704/10 |
| 9,501,520 | B2* | 11/2016 | Saito | G06F 17/277 |
| 2008/0195595 | A1* | 8/2008 | Masuyama | G06F 16/313 |
| 2014/0343926 | A1* | 11/2014 | Arai | G10L 15/063 |
| | | | | 704/9 |
| 2015/0074507 | A1* | 3/2015 | Riediger | G06F 16/00 |
| | | | | 715/230 |
| 2015/0161144 | A1* | 6/2015 | Goto | G06F 17/275 |
| | | | | 707/739 |
| 2018/0276568 | A1* | 9/2018 | Takahashi | G06F 16/313 |
| 2018/0365209 | A1* | 12/2018 | Wang | G06F 17/277 |

FOREIGN PATENT DOCUMENTS

| | | | |
|---|---|---|---|
| JP | 2011-238159 | A | 11/2011 |
| JP | 5155710 | B2 | 3/2013 |
| JP | 2013-105295 | A | 5/2013 |
| JP | 5894273 | B2 | 3/2016 |

* cited by examiner

FIG. 2A  Peel carrot and cut it into about match-stick-size sticks. ... Heat frying pan and stir-fry carrot and onion, add seasoning and carefully stir-fry with medium heat. ... If oil goes well enough, sprinkle sugar, add sake and scented white soup, and stir-fry for 1-2 minutes with low heat.

FIG. 2B  Cut radish and carrot into sticks, sprinkle salt, leave them for 10 minutes, and squeeze moisture. ... Make sweet vinegar and mix with radish. ... Finally mix with carrot and sprinkle sesame seeds.

FIG. 2C  After cutting carrot into julienne strips, heat oil in frying pan and stir-fry carrot. ... When carrot is wilted, add seasoning and egg (do not mix too much when stir-frying). ... When egg is cooked, it is ready.

FIG. 2D  Peel and cut radish into dice. Peel and grind carrot. ... Add radish and stir-fry and season to taste with salt and pepper. Finally add ground carrot and mix well, and serve on plate.

| 0 | 4 | 13 | ... | ... | |
|---|---|---|---|---|---|
| PEEL | CARROT | CUT | HEAT | ... | |

FIG. 3A

| 0 | 3 | 12 | 28 | 29 | ... |
|---|---|---|---|---|---|
| CUT | RADISH | CARROT | , | SPRINKLE | ... |

FIG. 3B

| PROCESS | 4 | CARROT | 0 | PEEL |
| --- | --- | --- | --- | --- |
| PROCESS | 4 | CARROT | 13 | CUT |
| BEFORE-AFTER | 0 | PEEL | 13 | CUT |
| BEFORE-AFTER | 13 | CUT | ... | HEAT |
| BEFORE-AFTER | ... | HEAT | ... | STIR-FRY |
| PROCESS | ... | CARROT | ... | STIR-FRY |
| PROCESS | ... | ONION | ... | STIR-FRY |
| ... | | | | |

FIG. 4A

| PROCESS | 3 | RADISH | 0 | CUT |
| --- | --- | --- | --- | --- |
| PROCESS | 12 | CARROT | 0 | CUT |
| ... | | | | |
| PROCESS | 12 | CARROT | ... | SQUEEZE |
| BEFORE-AFTER | 0 | CUT | 28 | , |
| BEFORE-AFTER | 28 | , | ... | LEAVE |
| BEFORE-AFTER | ... | LEAVE | ... | SQUEEZE |
| BEFORE-AFTER | ... | SQUEEZE | ... | MAKE |
| BEFORE-AFTER | ... | MAKE | ... | MIX |
| PROCESS | ... | RADISH | ... | MIX |
| ... | | | | |

FIG. 4B

| MORPHEME | APPEARANCE POSITION | ROOT FORM | PART OF SPEECH | CATEGORIES |
|---|---|---|---|---|
| PEEL | 0 | PEEL | VERB | |
| CARROT | 4 | CARROT | NOUN | PLANTS; ARTIFACTS-FOOD |
| AND | 10 | AND | CONJUNCTION | |
| CUT | 13 | CUT | VERB | |
| IT | 16 | IT | PRONAUN | |
| INTO | 18 | INTO | PREPOSITION | |
| ABOUT | 22 | ABOUT | PREPOSITION | |
| MATCH | 27 | MATCH | NOUN | ARTIFACTS-OTHER |
| - | 32 | - | SPECIAL | |
| ... | | | | |

| DIMENSIONS (COMPONENTS) | CONTENTS OF VARIABLES |
|---|---|
| 1 | 1 if the root form is "carrot", 0 otherwise. |
| 2 | 1 if the root form is "onion", 0 otherwise. |
| 3 | 1 if the root form is "radish (in Japanese characters)" or "radish (in Japanese Kanji characters)", 0 otherwise. |
| 4 | 1 if the root form is "green-pepper", 0 otherwise. |
| 5 | 1 if the part of speech is "noun", 0 otherwise. |
| 6 | 1 if the part of speech is "verb", 0 otherwise. |
| 7 | 1 if the part of speech is "particle", 0 otherwise. |
| 8 | 1 if "plants" appears in Categories, 0 otherwise. |
| 9 | 1 if "plants-part" appears in Categories, 0 otherwise. |
| 10 | 1 if "animals" appears in Categories, 0 otherwise. |
| 11 | 1 if "animals-part" appears in Categories, 0 otherwise. |
| 12 | 1 if "artifacts" appears in Categories, 0 otherwise. |
| 13 | 1 if "artifacts-food" appears in Categories, 0 otherwise. |
| 14 | 1 if "artifacts-other" appears in Categories, 0 otherwise. |

| WORDS (MORPHEME, (APPERANCE POSITION)) | FEATURE VALUES |
|---|---|
| PEEL(0) | (0, 0, 0, 0, 0, 1, 0, 0,0, 0, 0, 0, 0, 0) |
| CARROT(4) | (1, 0, 0, 0, 1, 0, 0, 1, 0, 0, 0, 0, 1, 0) |
| ... | ... |
|  |  |
|  |  |

FIG. 7

| DIMENSIONS (COMPONENTS) | CONTENTS OF VARIABLES |
|---|---|
| 1-14 | Feature values of the first word |
| 15-28 | Feature values of the second word |
| 29 | 1 if the phrase containing the first word has a direct dependency relationship with the phrase containing the second word, 0 otherwise. |
| 30 | 1 if the phrase containing the first word has an indirect dependency relationship with the phrase containing the second word, 0 otherwise. |
| 31 | 1 if the phrase containing the second word has a direct dependency relationship with the phrase containing the first word, 0 otherwise. |
| 32 | 1 if the phrase containing the second word has an indirect dependency relationship with the phrase containing the first word, 0 otherwise. |
| 33 | 1 if the phrase containing the first word is positioned before the phrase containing the second word, 0 otherwise. |

FIG. 8

| FIRST WORD | SECOND WORD | FEATURE VALUES |
|---|---|---|
| CARROT(4) | ... | (1, 0, 0, 0, 1, 0, 0, 1, 0, 0, 0, 0, 1, 0, ·········) |
| ... | CARROT(4) | (·········, 1, 0, 0, 0, 1, 0, 0, 1, 0, 0, 0, 0, 1, 0) |
| CARROT(4) | PEEL(0) | (1, 0, 0, 0, 1, 0, 0, 1, 0, 0, 0, 0, 1, 0, 0, 0, 0, 1, 0, 0, 0, 0, 0, 0, 0) |
| PEEL(0) | ... | (0, 0, 0, 0, 0, 1, 0, 0, 0, 0, 0, 0, 0, 0, ·········) |
| ... | | |

FIG. 9

| WORDS | PROBABILITY OF EXTRACTED WORD | DETERMINATION RESULTS |
|---|---|---|
| CUT (0) | 0.59 | ○ |
| RADISH(3) | 0.75 | ○ |
| AND(9) | 0.18 | × |
| CARROT (12) | 0.75 | ○ |
| ... | ... | ... |
|  |  |  |
|  |  |  |

FIG. 10

| FIRST WORD | SECOND WORD | PROBABILITY OF HAVING "PROCESS" RELATIONSHIP | DETERMINATION ON RESULTS ABOUT "PROCESS" RELATIONSHIP | PROBABILITY OF HAVING "BEFORE-AFTER" RELATIONSHIP | DETERMINATION ON RESULTS ABOUT "BEFORE-AFTER" RELATIONSHIP |
|---|---|---|---|---|---|
| RADISH(3) | carrot (12) | 0.48 | × | 0.21 | × |
| RADISH(3) | CUT (0) | 0.86 | ○ | 0.21 | × |
| carrot (12) | ,(28) | 0.86 | ○ | 0.48 | × |
| CUT (0) | ,(28) | 0.38 | × | 0.75 | ○ |
| ... | | | | | |

FIG. 11

DOCUMENT UNDERSTANDING SUPPORT APPARATUS, DOCUMENT UNDERSTANDING SUPPORT METHOD, NON-TRANSITORY STORAGE MEDIUM

CROSS-REFERENCE TO RELATED APPLICATION (S)

This application is based upon and claims the benefit of priority from Japanese Patent Application No. 2017-206194, filed Oct. 25, 2017; the entire contents of which are incorporated herein by reference.

FIELD

Embodiments described herein relate generally to a document understanding support apparatus, a document understanding support method, a non-transitory storage medium.

BACKGROUND

With the development of information processing technology, people are required to understand an unprecedented amount of information. Therefore, people seek technology that will efficiently extract information necessary for the people and eliminate unnecessary information. For instance, development of technology to extract necessary words from text in an input electronic document is advancing.

However, if only words are displayed, it is difficult to understand the contents. The importance of necessary words varies depending on users, types of documents, etc., and also changes with time, situation, etc. It is therefore difficult to maintain high levels of satisfaction for support.

BRIEF DESCRIPTION OF THE DRAWINGS

FIGS. 2A to 2D are diagrams, each illustrating an example of a learning document;

FIGS. 3A and 3B are diagrams, each illustrating an example of extraction target words;

FIGS. 4A and 4B are diagrams, each illustrating an example of extraction target word relationships;

FIG. 5 is a diagram illustrating an example of separated words;

FIG. 6 is a diagram for explaining a method of assigning feature values to words;

FIG. 7 is a diagram illustrating an example of feature values for words;

FIG. 8 is a diagram for explaining a method of assigning feature values to word relationships;

FIG. 9 is a diagram illustrating an example of feature values for word relationships;

FIG. 10 is a diagram illustrating an example of determination results for extracted words;

FIG. 11 is a diagram illustrating an example of determination results for extracted word relationships;

DETAILED DESCRIPTION

One embodiment of the present invention outputs information about the relationships between words in an electronic document recognized by machine-learning, and thereby facilitates the understanding of the contents.

A document understanding support apparatus as one embodiment of the present invention includes a word extraction condition learning device, a word extractor, a word relationship extraction condition learning device, a word relationship extractor, and an output device. The word extraction condition learning device creates a word extraction condition for extracting words from an electronic document by learning based on feature values assigned to respective words. The word extractor extracts words satisfying the word extraction condition. The word relationship extraction condition learning device creates a word relationship extraction condition for extracting word relationships from the electronic document by learning based on feature values with respect to extraction target word relationships. The word relationship extractor extracts a word relationship satisfying the word relationship extraction condition. The output device outputs at least either the extracted words or the extracted word relationship.

Below, a description is given of embodiments of the present invention with reference to the drawings. The present invention is not limited to the embodiments.

First Embodiment

Figure 1:
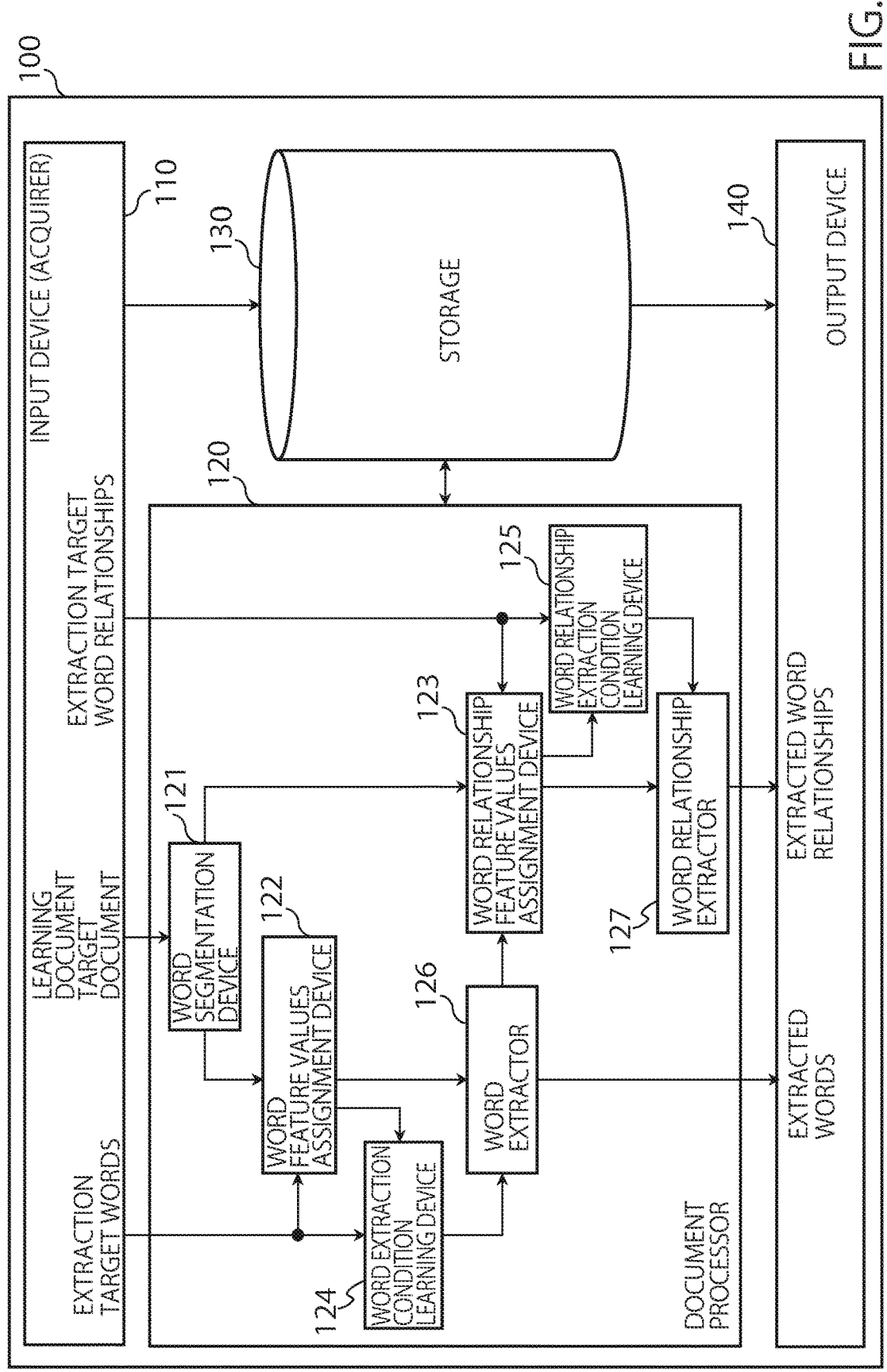
FIG. 1 is a block diagram illustrating an example of a document understanding support apparatus according to a first embodiment.

FIG. 1 is a block diagram illustrating an example of a document understanding support apparatus according to a first embodiment. A document understanding support apparatus 100 according to the first embodiment includes an input device (acquirer) 110, a document processor 120, storage 130, and an output device 140. The document processor 120 includes a word segmentation device 121, a word feature values assignment device 122, a word relationship feature values assignment device 123, a word extraction condition learning device 124, a word relationship extraction condition learning device 125, a word extractor 126, and a word relationship extractor 127.

The document understanding support apparatus 100 according to the first embodiment supports a user, who uses the document understanding support apparatus 100, to efficiently understand the contents of an electronic document input to the document understanding support apparatus 100. The electronic document is hereinafter simply referred to as the "document".

More specifically, the document understanding support apparatus 100 extracts words, which are supposed to be useful to facilitate the user's understanding, among words in the document. When it is determined that there is a certain kind of relationship between words constituting a combination which is one of the combinations of extracted words, the combination is extracted. With these words and combinations, even if the information amount of the electronic document is large, it is possible to reduce the load for understanding the document.

In this description, words mean partial text (a partial character string) constituting text (a character string) related to a document. The text related to the document may be text contained directly in the document, or may be text associated with the document. In this embodiment, there may be various criteria for segmenting text into words, and criteria are not particularly limited. For example, it is possible to use well-known techniques such as matching with predetermined partial text and morphological analysis using general-purpose dictionary data.

A word extracted by the document understanding support apparatus 100 is referred to as the "extracted word". Further, a combination of words is referred to as a "word relationship", and a word relationship extracted by the document understanding support apparatus 100 is referred to as the "extracted word relationship".

The relations about extracted word relationships, that is, the relationships between words constituting the extracted word relationships may include relations that are handled by well-known natural language processing techniques and knowledge condition processing techniques such as an appearance-order relationship in a document, an inclusion relationship on constituent characters (compound word relationship), a semantic inclusion relationship (relationship between hypernym and hyponym), or a dependency relationship.

It is preferable that the extracted words and extracted word relationships output by the document understanding support apparatus 100 differ depending on users using the document understanding support apparatus 100, types of input documents, etc. This is because necessary information differs if these are different. Moreover, the importance of words also changes with passage of time. Therefore, the document understanding support apparatus 100 of this embodiment creates and updates conditions (conditional expressions) for extracting extracted words and extracted word relationships by learning. Even when information output by the document understanding support apparatus 100 is not appropriate for the user's request, or even when information to be output has change, the document understanding support apparatus 100 can gradually makes the output information correspond to the user's request. Thereby, the user's satisfaction with respect to support is maintained.

Incidentally, the configuration illustrated in FIG. 1 is merely an example, and may include other component. In addition, the components illustrated in FIG. 1 may be plural. For example, each of the input device 110, the storage 130, and the output device 140 is illustrated as one component, but they may be provided separately for each of corresponding information. For example, input device 110 may be separated as follows: an acquirer that acquires learning data described later; an acquirer that acquires a document; and an acquirer that acquires edited data. The storage 130 and the output device 140 may be provided in a similar manner.

Each component of the document understanding support apparatus 100 will be described. The input device 110 acquires information necessary for the processing in the document processor 120. The acquisition source of the information is not particularly limited, and it is possible to receive information (data) from an input device operated by a user. Alternatively, it is possible to actively acquire files stored in an external device. In this embodiment, necessary data includes at least data necessary for learning conditions used for extracting extracted words and extracted word relationships, and a document by the document understanding support apparatus 100. The data necessary for learning is hereinafter referred to as "learning data". Also, a document which the apparatus supports to understand is referred to as a "target document". In other words, the input device 110 acquires learning data and a target document.

The learning data includes a document for machine-learning, extraction target words, and extraction target word relationships. The learning document is a document created for learning. The extraction target words are predetermined words to be extracted from words contained in the learning document. The extraction target word relationships are relationships between predetermined extraction target words among word relationships contained in the learning document. The extraction target words and the extraction target word relationships are preferably adjusted according to users.

Incidentally, the input device 110 does not need to receive the learning document, the extraction target words and the extraction target word relationships at a time, and may acquire them separately. Further, the input device 110 may perform preprocessing for the processing of the acquired data in the document processor 120. For example, when the input device 110 receives a document containing a mix of diagram and text, the text portion may be extracted from the document. In other words, the acquired document may include data other than text data.

FIGS. 2A to 2D are diagrams, each illustrating an example of learning documents. FIGS. 2A to 2D illustrate four learning documents. As illustrated in FIGS. 2A to 2D, texts are written in the learning documents. all of the texts describe cooking recipes.

FIGS. 3A and 3B are diagrams, each illustrating an example of extraction target words. Some of the extraction target words contained in the learning documents illustrated in FIGS. 2A and 2B are shown in FIGS. 3A and 3B, respectively. The learning documents relate to cooking recipes, and therefore cooking operations, cooking objects, etc. are shown as the extraction target words. Thus, the extraction target words and the extraction target word relationships may be determined according to the contents of the learning documents.

The examples in FIGS. 3A and 3B are presented in a tabular format in which the extraction target words are shown in the lower row, and the first appearance position of each extraction target word in each learning document is shown in the upper row.

FIGS. 4A and 4B are diagrams, each illustrating an example of extraction target word relationships. Some of the extraction target word relationships contained in the learning documents illustrated in FIGS. 2A and 2B are shown in FIGS. 4A and 4B, respectively. Since the learning documents are about cooking recipes, in order to easily understand the cooking, the word relationships about the flow of the cooking operations, the relationships between the cooking objects and the cooking operations, etc. are shown as the extraction target word relationships.

In the examples in FIGS. 4A and 4B, the extraction target word relationships are presented in a tabular format in which the relationships about the extraction target word relationships are shown in the first column. "PROCESSING" shows the relationship between a word indicating an object to be processed and a word indicating a processing operation.

"BEFORE-AFTER" shows the relationship between words corresponding to the order of processing operations. The second and fourth columns indicate the first appearance positions of the words shown in the respective next columns in the learning document. The third column and the fifth column show words included in the word relationships.

FIGS. 2A to 4B illustrate examples and do not limit the formats, etc. to those illustrated. The learning data may be edited. For example, when the appearance position is not included in the data about the extraction target words and the extraction target word relationships at the time the data is acquired by the input device 110, the input device 110 or another component may add data, such as the appearance positions, with reference to the learning document.

Another target document that is another necessary data may be of the same format as the learning document. Therefore, the learning documents illustrated in FIGS. 2A to 2D may be used as the target documents.

The document processor 120 performs a learning process and a support process, on the basis of data from the input device 110. The learning process is a process of creating two extraction conditions: a word extraction condition; and a word relationship extraction condition, on the basis of learning data. The support process is a process of extracting words and word relationships that match the extraction conditions from the target document on the basis of the two extraction conditions.

The internal configuration of the document processor 120 will be described. The word segmentation device 121 separates the text in the learning document and the target document into words. FIG. 5 is a diagram illustrating an example of the separated words. In the example in FIG. 5, morpheme information when a morpheme is a unit of word segmentation is shown.

A well-known technique may be used as a method of segmenting text into morphemes. For example, there are JUMAN developed by Kyoto University and ChaSen developed by Nara Institute of Science and Technology.

The morpheme information shown in FIG. 5 includes morphemes obtained from the text shown in FIG. 2A by JUMAN, and supplementary information for the morphemes. In the example in FIG. 5, "APPEARANCE POSITION", "ROOT FORM", "PART OF SPEECH", and "CATEGORIES" are shown as the supplementary information. "APPEARANCE POSITION" means the appearance position of the first character of a morpheme in the document, "ROOT FORM" means the root form of the conjugated form of a morpheme, and "PART OF SPEECH" indicates the grammatical classification of the morpheme. "CATEGORIES" indicate semantic classifications of morphemes which are predetermined by JUMAN's algorithm. When a plurality of categories are defined for one morpheme, categories to which one morpheme belongs are distinguished by a semicolon. For example, "CARROT" belongs to the category "PLANTS" and also belongs to the subcategory "FOOD" within the category "ARTIFACTS".

For each separated word, the word feature values assignment device 122 assigns feature values corresponding to the word. The word relationship feature values assignment device 123 comprehensively combines a plurality of given words to create word relationships, and assigns feature values corresponding to each word relationship to the word relationship. The feature values indicate characteristics of a word or a word relationship, and are represented by a multidimensional vector.

FIG. 6 is a diagram for explaining a method of assigning feature values to words. The feature values of the example in FIG. 6 are a fourteen-dimensional vector having the first to fourteenth components. The dimension number is shown in the first column, and the contents meant by the value of each dimension are shown in the second column. In the example in FIG. 6, in the case of the word "carrot", the value of the first dimension of the feature values is 1, and the values of the second dimension to the fourth dimension are zero. As shown in FIG. 5, since the part of speech of "CARROT" is "NOUN", the value of the fifth dimension is 1, and the values of the sixth and seventh dimensions are zero. In this manner, feature values are assigned to each word. For each value of the feature values, a determination item list for assigning such feature values may be prepared.

FIG. 7 is a diagram illustrating an example of feature values for words. Words and the feature values assigned to the respective words as described above are shown.

FIG. 8 is a diagram for explaining a method of assigning feature values to word relationships. The feature values in the example in FIG. 8 are a 33-dimensional vector having first to thirty third components. In the example in FIG. 8, the values of the first to the 14th dimensions are the same as those of the feature values of the first word included in the word relationship. The 15th to the 28th dimensions are the same as the feature values of the second word included in the word relationship. In the 29th to the 33rd dimensions, feature values related to the relationship about the word relationship are assigned. For example, in the case of a word relationship where the first word is "carrot" and the second word is "peel", since "peel carrot" appears in the text in FIG. 2A, the value of the 29th dimension of the feature values is 1.

FIG. 9 is a diagram illustrating an example of feature values for word relationships. The first and second words included in the word relationships and the feature values assigned to each word relationship as described above are shown.

Incidentally, the examples of the feature values assignment methods shown in FIGS. 6 and 8 have already been adjusted to match a target document to be input. However, in the design stage of the document understanding support apparatus 100, in most cases, it is uncertain how to design the contents meant by each dimension of the feature values. For this reason, the contents meant by each dimension of the feature values may be not uniquely determined in the first place. As the document understanding support apparatus 100 is used, the document understanding support apparatus 100 may select a determination item list which seems to be preferable among a plurality of prepared determination item lists. For example, in the field of machine learning technology, a technique called "feature selection" for narrowing down feature values with high selection effect by a predetermined evaluation method has been established. Therefore, the contents meant by each dimension of the feature values may be adjusted using such a well-known technique of feature selection. Furthermore, by giving an identifier (first identifier) for identifying a determination item list to the input device 110, feature values may be assigned using a determination item list corresponding to the value of a corresponding identifier among the plurality of determination item lists.

The word extraction condition learning device 124 creates a word extraction condition by learning based on the extraction target words in a learning document and the feature values assigned to the respective words in the learning document. The word extraction condition is a condition for extracting a word from a target document and is also a condition for determining whether or not the word in the target document is to be extracted. In this embodiment, an event where a word in the target document is a word to be extracted is regarded as a probability event, and if the probability that the event will occur is equal to or higher than a threshold value, the word corresponding to the probability is extracted. Therefore, the word extraction condition is represented by an expression for calculating the probability event.

An example using a logistic regression model as an example of word extraction condition is shown. The logistic regression model is generally expressed in the form of the following expression (1). In the logistic regression model, the probability $p_i$ representing the occurrence of the i-th (i is an integer) probability event is calculated on the basis of input variable $x_i$ and parameters $\alpha$ and $\beta$. The value of probability $p_i$ is compared with a predetermined threshold value to determine whether or not the i-th probability event occurs.

[Expression 1]

$$logit(p_i) = \ln\left(\frac{p_i}{1-p_i}\right) = \alpha + \sum_j \beta_j x_{i,j} \quad (1)$$

As described above, in the process in the word extraction condition learning device 124, the probability event means the extraction of a word. Therefore, the probability $p_i$ indicates the probability of extracting the i-th word, and the input variable $x_i$ indicates the feature values of the i-th word. The variable j indicates the j-th dimension included in the feature values $x_i$.

It is assumed that when the probability obtained by the probability calculation expression such as Expression (1) exceeds the threshold value, the word according to the probability is extracted. In this case, the probability $p_i$ with the parameters $\alpha$ and $\beta_j$ as variables, which is obtained by inputting the feature values of the extraction target words related to the learning document into $x_i$ of Expression (1), needs to exceed the threshold value. Therefore, the word extraction condition learning device 124 calculates the values of the parameters $\alpha$ and $\beta_j$ so that all of the probabilities $p_i$ having the parameters $\alpha$ and $\beta_j$ as variables, which are calculated for each word to be extracted, exceed the threshold value. Thus, learning is performed so that the values of parameters $\alpha$ and $\beta_j$ approach the optimum values. As a learning method, a well-known method such as a maximum likelihood method can be used.

Incidentally, a plurality of word extraction conditions may be created. For example, learning may be classified according to users, types of documents, etc. As a result, it is possible to create word relationship extraction conditions classified for each user and each type of document.

The word relationship extraction condition learning device 125 creates a word relationship extraction condition by learning based on the extraction target word relationships in the learning document and the feature values assigned to the respective word relationships in the learning document. The word relationship extraction condition is a condition for extracting a word relationship from the target document, and is also a condition for determining whether a word relationship related to words in the target document is to be extracted.

In this embodiment, when it is assumed that words in the target document have certain kind of relation (in other words, a word relationship in the target document is to be extracted) as a probability event, and when the probability of occurrence of the event is equal to or higher than a threshold value, the word relationship is determined to be an extraction target word relationship. The same expression as that for the creation of the word extraction condition may be used for the probability calculation expression for the extraction target word relationship. In this case, the probability $p_i$ indicates the probability of extracting the i-th word relationship, and the input variable $x_i$ indicates the feature values of the i-th word relationship.

Incidentally, the probability calculation expression for the extraction target word relationship may be provided separately for each kind of relationship about the extraction target word relationships. For example, a probability calculation expression for determining the presence or absence of a before-after relationship and a probability calculation expression for determining the presence or absence of a process relationship may be present separately.

Similarly to the word extraction condition, word relationship extraction conditions for each user and each type of document may be created by classifying learning according to users, types of documents, etc.

The word extractor 126 extracts words satisfying the word extraction condition from the words in a target electronic document on the basis of the feature values assigned to the respective words in the target document. More specifically, for each word contained in the target document, the word extractor 126 inputs the feature values of the word into the probability calculation expression as the extraction condition, and calculates the probability that the word is an extraction target. Then, by comparing the calculated probability with a predetermined threshold value, a determination is made as to whether or not the word should be extracted. The word determined to be extracted is extracted as an extracted word.

For example, assume that the parameters ($\alpha$, $\beta_1$, $\beta_2$, ..., $\beta_{15}$) in the probability calculation expression of Expression (1) are calculated to be (−0.5, 0.6, 0.8, 0.6, 0.8, 0.4, 0.7, −1.0, 0.2, 0.1, 0, −0.3, 0.2, 0.4, −0.4). The word extractor 126 inputs the feature values (1, 0, 0, 0, 1, 0, 0, 1, 0, 0, 0, 0, 1, 0) of the word "carrot" in $x_i$ of Expression (1) to calculate the probability $p_i$.

[Expression 2]

$$p_i = \frac{1}{1 + \exp(-(\alpha + \sum_j \beta_j x_{i,j}))} =$$

$$\frac{1}{1 + \exp(-(-0.5 \cdot 1 + 0.6 \cdot 0 + 0.8 \cdot 0 + 0.6 \cdot 0 + 0.8 \cdot 1 + \ldots + (-0.4) \cdot 0))} =$$

$$\frac{1}{1 + \exp(1.1)} = \sim 0.75$$

Here, if the threshold value is 0.5, since the probability is higher than the threshold value, the word "carrot" is extracted.

FIG. 10 is a diagram illustrating an example of the determination results for the extracted words. Words in the target document are shown in the first column of the table of FIG. 10, the probability that a word is an extracted word is shown in the second, column, and the determination result is shown in the third column. Thus, the probability is calculated and determined for each of the words in the target document, and extracted words are determined.

The word relationship extractor 127 receives the extracted words from the word extractor 126 and creates word relationships established by the extracted words. On the basis of the feature values assigned to the word relationship, a word relationship is extracted, the word relationship being established by the words satisfying the word extraction condition and satisfies the word relationship extraction condition.

The word relationship extraction may be performed in the same manner as the word extraction. Specifically, with respect to each word relationship, the feature values of the word relationship are input to the probability calculation expression as the extraction condition, and the probability of extracting the word relationship is calculated. Then, by comparing the calculated probability with a predetermined threshold value, a determination is made as to whether the word relationship is to be extracted. The word relationship determined to be extracted is extracted as an extracted word relationship. If a calculation expression is provided separately for each processing such as for a dependency relationship or a before-after relationship, a word relationship may be extracted for each processing.

FIG. 11 is a diagram illustrating an example of the determination results for the extracted word relationships. Words in the target document are shown in the first column and the second column of the table in FIG. 11. The probability that the word relationship between words shown in the first column and the second column has a process relationship is shown in the third column, and the determination result as to whether or not there is a process relationship is shown in the fourth column. Moreover, the probability that the word relationship between words shown in the first column and the second column has a before-after relationship is shown in the fifth column, and the determination result as to whether or not there is a before-after relationship is shown in the sixth column. Thus, a determination as to whether or not a word relationship is extracted may be made for each kind of relationship.

With the above-described components, the document processor 120 performs the learning process and the support process, on the basis of the data from the input device 110.

The storage 130 stores information necessary for the processing by the document understanding support apparatus 100, and processing results in the document support processing apparatus. The processing result in each component of the document understanding support apparatus 100 may be stored in the storage 130 every time processing is performed. In addition, each component of the document understanding support apparatus 100 may acquire information necessary for processing from the storage 130, instead of from a component that created the information.

The output device 140 outputs the processing results in the document understanding support apparatus 100, such as the extracted words and the extracted word relationships. The information output by the output device is not particularly limited and other information such as information used for processing in the document understanding support apparatus 100 may also be output.

The output method of the output device 140 is not particularly limited. The output device 140 may display the processing results as an image on a screen, or may output the processing results as a data file to an external device. For example, the output device 140 may display a user interface editable by the user on an external device, such as a monitor connected to the document understanding support apparatus 100, and output the processing results to the user interface. Incidentally, the input device 110 may acquire information such as learning data from the user interface.

Figure 12:
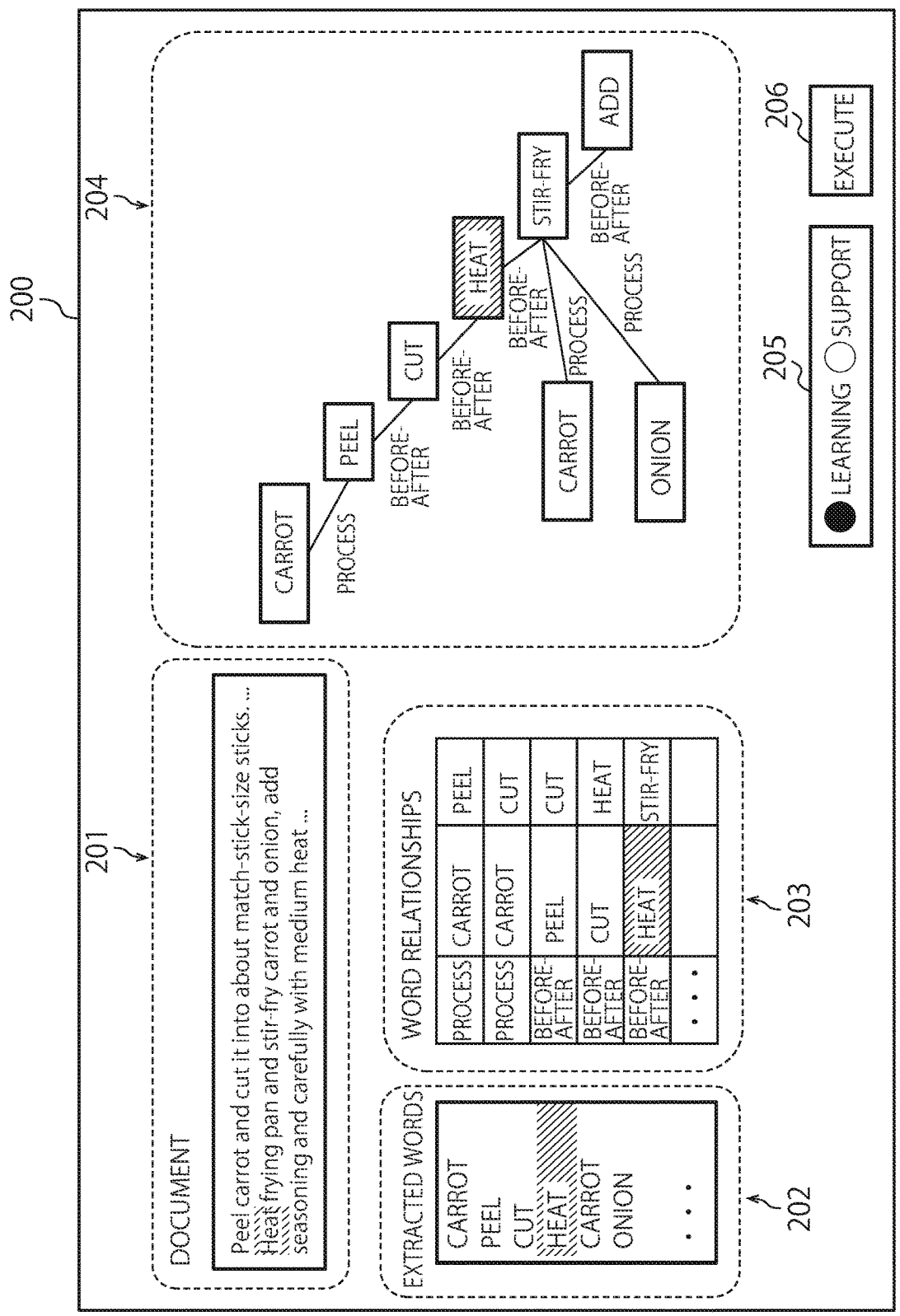
FIG. 12 is a diagram illustrating an example of a user interface.

FIG. 12 is a diagram illustrating an example of the user interface. Through an interface 200 shown in FIG. 12, the input device 110 receives the information, and the output device 140 displays the information. From the viewpoint of development costs, it is preferable to use one interface, but separate interfaces may be used for input and output.

An area 201 in the interface 200 is a display area for a document. For example, it is possible that when an editable text box is displayed and the user inputs text in a learning document or a target document into the text box, the input device 110 acquires the text in the text box. Further, it is possible that when the output device 140 outputs a processing result, the text in the target document used is output to the text box.

An area 202 in the interface 200 is a display area for extraction target words or an extracted word, and an area 203 is a display area for extraction target word relationships or an extracted word relationship. For example, editable lists are displayed in the areas 202 and 203, respectively, and the user inputs extraction target words and extraction target word relationships in the respective lists. Then, the input device 110 will acquire these lists and use the extraction target words and the extraction target word relationships in the lists as learning data. The output device 140 will output the extracted words and the extracted word relationships to the respective lists.

In the case where certain extraction target words appear once in the document, such as when the same expression is not used in the document, the user may omit the input of the appearance positions of the words by matching the order of the words in the list with the order of appearance of the words in the text in the document and regarding the order of the words in the list as the input of the appearance positions of the words.

An area 204 in the interface 200 is a display area for the relationships about the extraction target word relationship or the extracted word relationship. In the example in FIG. 12, the relationships are drawn in a graph network (tree structure) format. Thus, it is possible to confirm the overall picture of word relationships in the document.

According to this tree structure, it is understood that "CARROT" is processed in the order of "PEEL", "CUT" and "HEAT". It is also understood that there is a process of "STIR-FRY" for "CARROT" and "ONION" after "HEAT" for "CARROT". As in this example, when at least an object to be processed and a content of process are included in the extracted words and at least a process relationship and the before-after relationship are included as the relations about the extracted word relationship, it is possible to show the extracted words in the order of the object to be processed or in the order of processes in a tree structure. This makes it easy to understand the flow of processes. It can be said that such an output is a summary of the target document.

Incidentally, it is possible to change the conjugated form of an extracted word to be output. For example, in Japanese, if separated words are displayed as they were, some words are difficult to read because of the conjugated forms. Therefore, in order to allow the user to easily understand the contents, the extracted words may be output after changing the conjugated forms to the root forms. In the example in FIG. 12, the relations about the word relationships are shown in a tree structure in the area 204, and the verb words are displayed after changing the conjugated forms to the root forms. As the method of changing the conjugated form, it is possible to use, for example, a method that refers to a correspondence table of conjugated forms of words stored in advance in the storage 130, such as "ROOT FORMS" shown in FIG. 5. Alternatively, it is possible to use a method that makes an inquiry to an external device.

A radio button 205 indicates whether the display of the interface 200 relates to learning or support. When an execution button 206 is pressed, the document understanding support apparatus 100 is instructed to execute the process indicated by the radio button 205 by using the information in the interface 200. For example, when the execution button 206 is pressed while "LEARNING" in the radio button 205 is selected, the information shown in the areas 201 to 203 is sent to the input device 110, and the learning process is performed on the basis of the information. On the other hand, when the execution button 206 is pressed while "SUPPORT" in the radio button 205 is selected, the text shown in the area 201 is sent to the input device 110, and the support process is performed on the basis of the text, and then extracted words and extracted word relationships are displayed as the processing results in the areas 202 and 203, respectively.

When there are separate interfaces for input and for output, the radio button 205 may be omitted. For other operations on the interface 200, such as copying of text or pasting, it is possible to use well-known techniques to improve users' convenience. Additionally, an area for inputting or displaying an identifier for identifying a current user such as user ID, an identifier for identifying the type of a document, etc. may be prepared to input the identifier (second identifier) to the input device 110. By changing the extraction condition that is created by the learning process and the extraction condition that is used for the support process in accordance with these pieces of information, it is possible to provide different supports according to users and types of documents.

Figure 13:
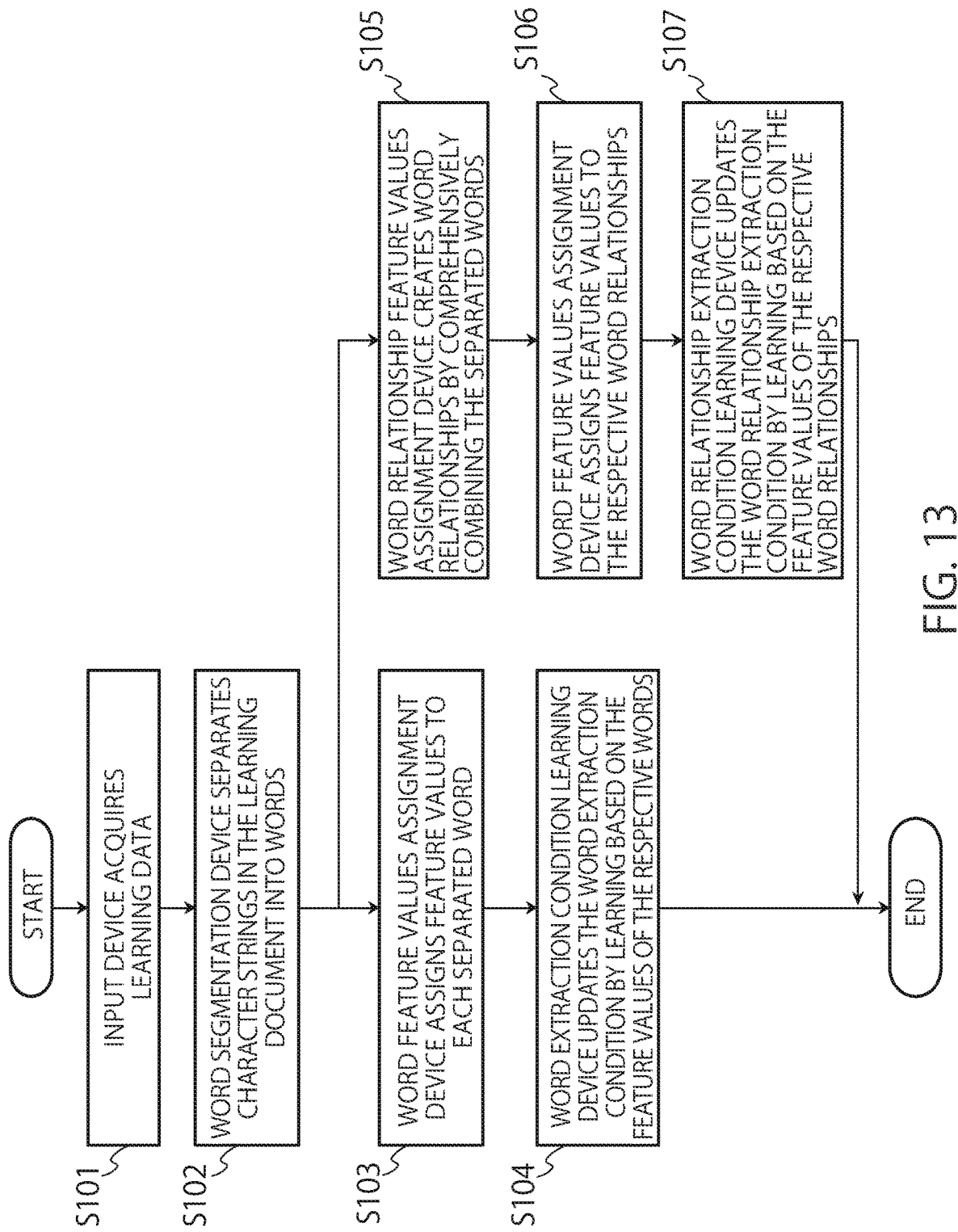
FIG. 13 is a diagram illustrating an example of a schematic flowchart of a learning process.

The flow of processes to be performed by the respective components will be described. First, a process related to the learning of extraction conditions will be described. FIG. 13 is a diagram illustrating an example of a schematic flowchart of the learning process.

The input device 110 acquires learning data such as a learning document, extraction target words, and extraction target word relationships (S101). The learning document is sent to the word segmentation device 121, and the word segmentation device 121 separates the text in the learning document into words (S102). The separated words by the word segmentation device 121 are sent to the word feature values assignment device 122 and the word relationship feature values assignment device 123.

The word feature values assignment device 122 assigns feature values to each separated word (S103). Then, the word extraction condition learning device 124 updates the word extraction condition by learning based on the feature values of the respective words (S104). In other words, the word extraction condition learning device 124 creates a new word extraction condition.

On the other hand, the word relationship feature values assignment device 123 combines the separated words comprehensively and creates word relationships (S105). Then, the word feature values assignment device 122 assigns feature values to each word relationship (S106). The word relationship extraction condition learning device 125 updates the word relationship extraction condition by learning based on the feature values of the respective word relationships (S107). In other words, the word relationship extraction condition learning device 125 creates a new word relationship extraction condition. Thus, two extraction conditions, namely the word extraction condition and the word relationship extraction condition, are created, and the learning process ends.

Figure 14:
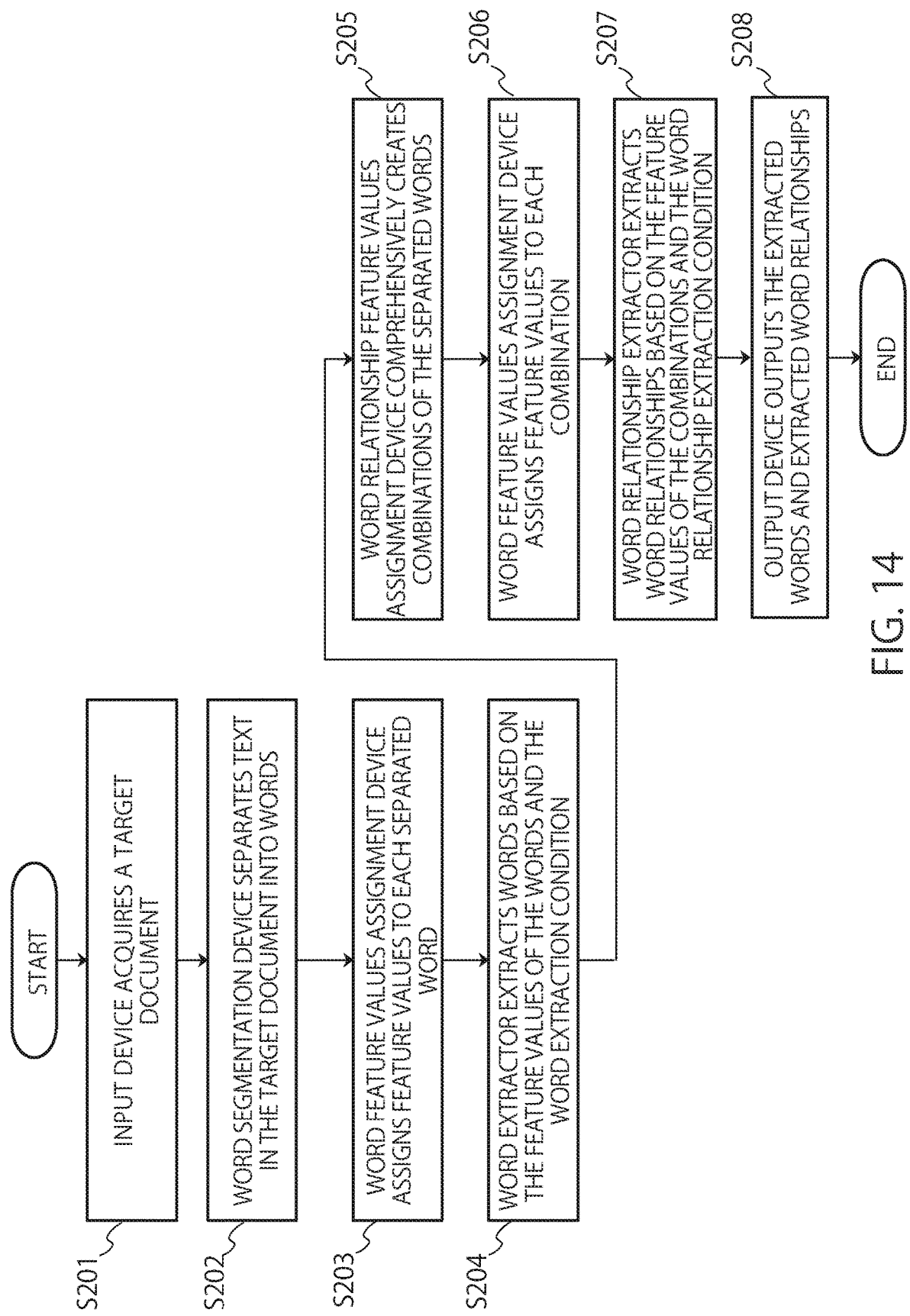
FIG. 14 is a diagram illustrating an example of a schematic flowchart of a support process.

Next, a process related to support will be described. FIG. 14 is a diagram illustrating an example of a schematic flowchart of the support process.

The input device 110 acquires a target document (S201), and the word segmentation device 121 separates the text in the target document into words (S202). Similarly to the learning process, the word feature values assignment device 122 assigns feature values to each of the separated words (S203). Then, the word extractor 126 extracts words, on the basis of the feature values of the words and the word extraction condition that has already been calculated by the learning process (S204).

On the other hand, the word relationship feature values assignment device 123 comprehensively combines the extracted words and creates word relationships (S205), and assigns feature values to each of the comprehensively created word relationships (S206). Then, the word relationship extractor extracts word relationships, on the basis of the feature values of the word relationships and the word relationship extraction condition that has already been calculated by the learning process. Thus, the extracted words and the extracted word relationships are found.

The output device 140 outputs the extracted words and the extracted word relationships to a predetermined output destination such as an interface (S208). As a result, the user can understand the contents of the target document, and the support process ends.

Incidentally, the above-described flow charts are merely examples and do not limit the order of processes, etc. as long as necessary processing results are obtained. In addition, the processing results of the respective processes may be stored sequentially in the storage 130, and the respective components may acquire the processing results with reference to the storage 130.

As described above, according to this embodiment, by updating the extraction condition in accordance with learning, words and word relationships required at present by the user are output. Consequently, it is possible to reduce the time required to understand the contents. Moreover, outputting of the word relationships makes it easier to understand the contents of the document. For example, in the case of a document about cooking recipes, it is possible to quickly understand the flow of cooking operations and particularly, if a vegetable is an object, the relationships between the vegetable and the cooking operations.

Incidentally, the above-described embodiment is merely an example, and part of the components in the above embodiment may be included in an external device. For example, the above embodiment includes the word segmentation device 121, but the word segmentation device 121 may be included in an external device. In this case, the input device 110 acquires words in a document from the external device and passes the words to components that use words in the document, such as the word feature values assignment device 122 and the word relationship feature values assignment device 123.

Incidentally, a planning device may be constituted by a plurality of devices capable of delivering data by communication or electric signals. For example, a first device (learning apparatus) having the word extraction condition learning device 124, the word relationship extraction condition learning device 125, etc. and a second device (support apparatus) having the word extractor 126, the word relationship extractor 127, etc. may be separately provided.

Second Embodiment

A second embodiment will be described. In the document understanding support apparatus 100 of this embodiment, the extracted words and word relationships output by the apparatus are edited by the user, etc. and then input again to the apparatus. More user-oriented learning is available by using this fed-back data as the learning data. In particular, this fed-back data is referred to as the "edited data".

Figure 15:
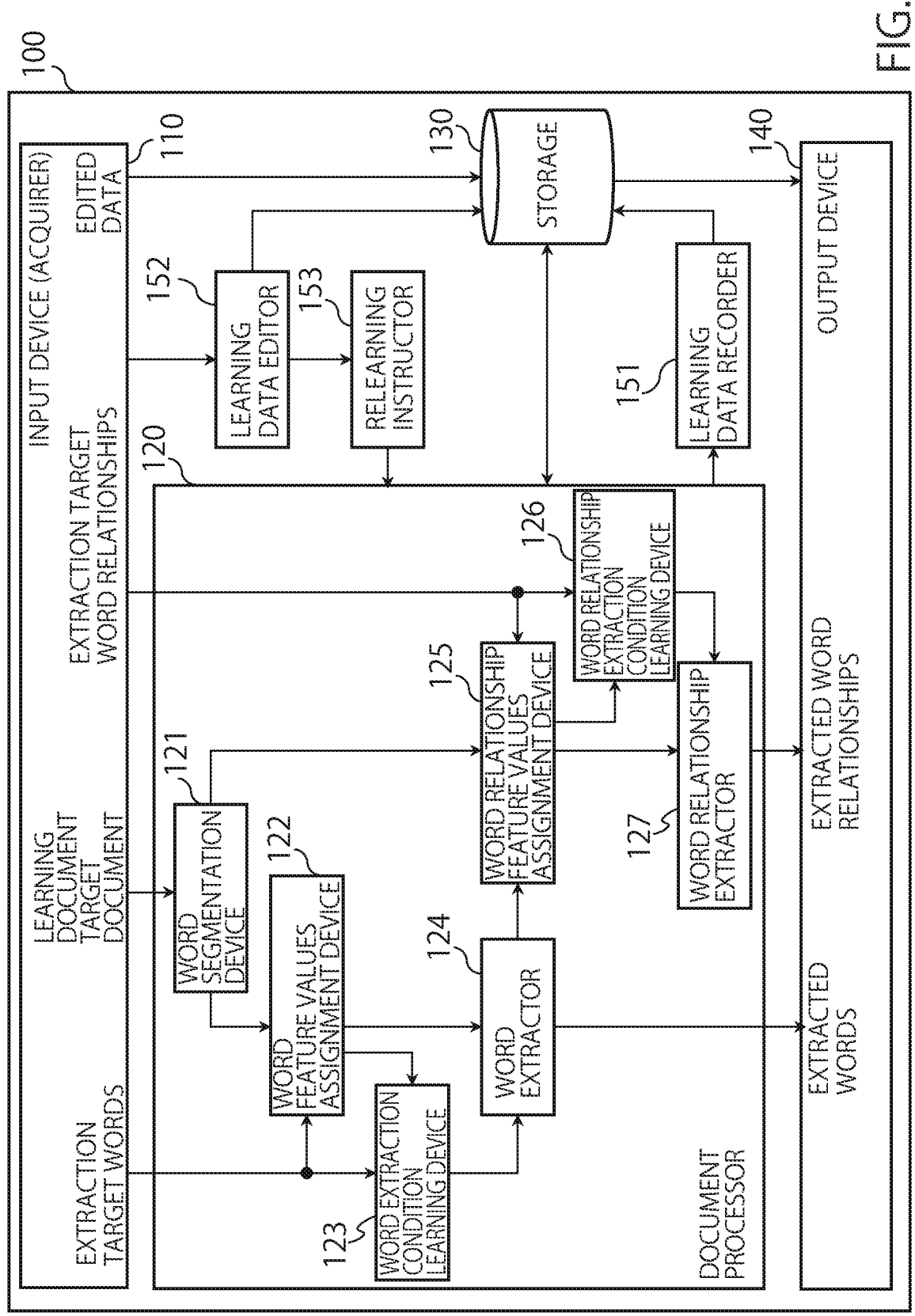
FIG. 15 is a block diagram illustrating an example of a schematic configuration of a document understanding support apparatus according to a second embodiment.

FIG. 15 is a block diagram illustrating an example of the schematic configuration of the document understanding support apparatus according to the second embodiment. In the second embodiment, the document understanding support apparatus 100 according to the first embodiment further includes a learning data recorder 151, a learning data editor 152, and a relearning instructor 153. The second embodiment is different from the first embodiment on this point. Descriptions of the same points as in the first embodiment will be omitted.

The learning data recorder 151 combines pieces of data related to the support process, and records the data in the storage 130 as one piece of learning data. This is to use the results of the support process for learning. Specifically, the support process extracted words and extracted word relationships are recorded in the storage 130 as the extraction target words and the extraction target word relationships. In other words, the storage 130 stores the extraction target words and the extraction target word relationships as the learning data. These pieces of data used for the support process will be hereinafter referred to as the "support data". The support data includes at least the target document, the extracted words, and the extracted word relationships. As a result, the combination relationships among the target document, the extracted words, and the extracted word relationships are kept. The separated words in the target document, word feature values, and word relationship feature values may also be included in the support data. Further, it is possible to record the combination in the storage 130 separately from the learning data used for the learning process so far.

The target document, extracted words, and extracted word relationships may be recorded as, for example, a database in the same record. Alternatively, the target document, extracted words, and extracted word relationships are recorded individually, and an identifier for identifying a combination is given so that a combination to which the respective components belong is identifiable.

Incidentally, the learning data recorder 151 may not only store the learning data in the storage 130, but also perform processing on the recorded learning data in the storage 130. For example, it is possible to distinguish a combination by assigning an identifier to a recorded target document, extracted words, and extracted word relationships.

The input device 110 acquires edited data created by editing the output results for the target document by the user. The extracted words and the extracted word relationships recorded together with the target document as the results of the support process may not be correct in some cases. The edited data is for giving correct answers to the target document and making it possible to use the correct answers as new learning data. Incidentally, editing includes addition, deletion, and change of data.

It is not necessary to limit the edited data to one format. For example, the edited data may be in a format that includes incorrect data among extracted words and extracted word relationships extracted by the word extractor 126 and the word relationship extractor 127, and correct data therefor. This makes it possible to change incorrect data to correct data. Alternatively, only correct data for the target document may be included. In this case, after deleting all the extracted words and the extracted word relationships extracted by the support process from the recorder 130, the correct data is added.

For the inputting of the edited data to the input device 110, an interface for inputting edited data may be prepared. Alternatively, it is possible to use the interface 200 described in the first embodiment. In particular, it is possible to use a user interface having a general text editing function capable of editing extracted words output by the output device 140. In this case, since the user can start editing in a state in which data to be edited has already been input, preparation, such as copying the output data to the editing interface, is not required. Thus, the edited data is preferably created on the same interface because it not only reduces the development costs but also improves the user's convenience.

The learning data editor 152 edits the learning data in the storage 130 on the basis of the edited data acquired by the input device 110. Consequently, addition of a learning data record, change of the contents of learning data, and deletion of learning data record are performed. As a result, less accurate learning data in the storage 130 is corrected.

The relearning instructor 153 instructs relearning to the components related to relearning. The components related to relearning include at least the word extraction condition learning device 124 and the word relationship extraction condition learning device 125. The word extraction condition learning device 124 and the word relationship extraction condition learning device 125 that have received the relearning instruction read the learning data in the storage 130, learn in the same manner as in the first embodiment, update the extraction conditions. If a document is registered in the learning data but the separated words in the document and the feature values of the words are not included, it is possible to send the learning document from the relearning instructor 153 to the word segmentation device 121 and perform the learning process in the same manner as in the first embodiment.

Relearning may be performed every time edited data is received, or may be performed when more edited learning data than a predetermined amount is accumulated in the storage 130. Therefore, the timing at which the relearning instructor 153 instructs relearning may be determined on the basis of a number of criteria, such as a predetermined time, the timing at which the learning data was edited, the timing at which the number of times the learning data was edited exceeds a predetermined number of times, the timing at which the amount of the edited learning data exceeds a predetermined amount, and the timing at which an instruction from the user was received. For example, in the case where the word extraction condition or the word relationship extraction condition is created by a logistic regression model, it is preferable to perform learning collectively at the time when the edited data exceeds the predetermined amount rather than consecutive learning.

Incidentally, the relearning instructor 153 may instruct which learning data in the storage 130 is to be read out. Alternatively, all of the learning data in the storage 130 may be read out. The relearning instructor 153 may instruct to read only the learning data based on the support results, or may instruct to read only the learning data edited by the learning data editor 152. It is possible to discriminate these distinctions by setting a flag, etc. for the learning data processed by the learning data recorder 151 and the learning data editor 152.

Figure 16:
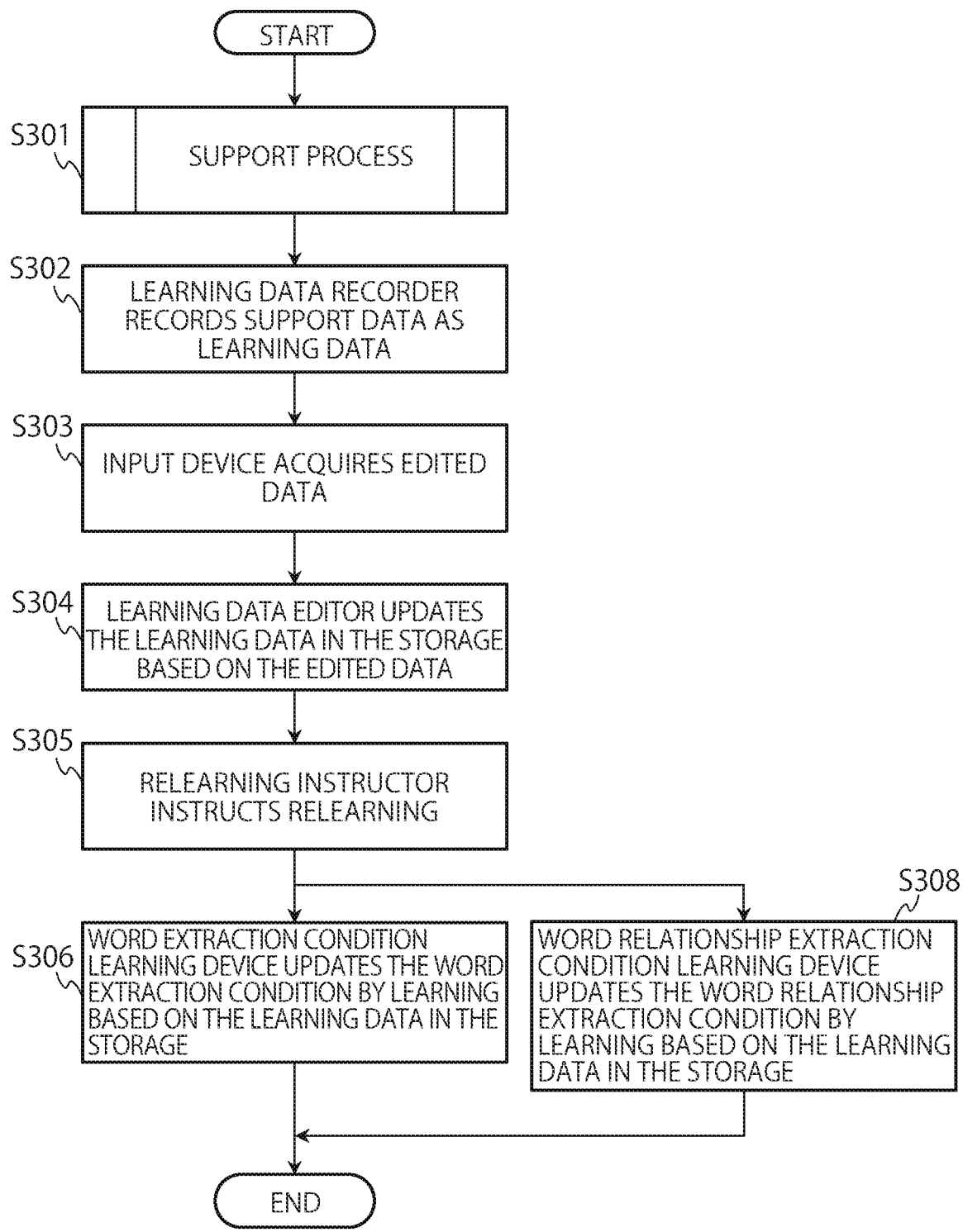
FIG. 16 is a diagram illustrating an example of a schematic flowchart of a relearning process.

Next, a process related to relearning will be described. FIG. 16 is a diagram illustrating an example of a schematic flowchart of the relearning process.

After the support process (S301) described in the first embodiment, the learning data recorder 151 records the support data as the learning data (S302).

On the other hand, when the output result of the support process is output and the user edits the output result, the input device 110 acquires the edited data based on the edition (S303). The edited data is sent to the learning data editor 152, and the learning data editor 152 updates the learning data in the storage 130, on the basis of the edited data (S304). As a result, the learning data in the storage 130 is more suitable for the user's preference.

The relearning instructor 153 instructs the word extraction condition learning device 124 and the word relationship extraction condition learning device 125 to relearn at a timing based on a predetermined condition (S305). Then, the word extraction condition learning device 124 performs learning on the basis of the learning data in the storage 130 and updates the word extraction condition (S306). The word relationship extraction condition learning device 125 also performs learning on the basis of the learning data in the storage 130 and updates the word relationship extraction condition (S307). The above is the flow of the relearning process. Thereafter, by performing the support process again, extracted words that more reflect the user's preference as compared to before the relearning are obtained.

As described above, according to this embodiment, the support data obtained by the support process is used as one piece of learning data. As a result, it is possible to reduce the amount of learning data to be prepared. Moreover, since the support data is edited according to the user's preference, the extraction condition is updated to more reflect the user's preference. Further, with the relearning instructor 153, it is possible to perform relearning at an effective timing, such as when the amount of edited data exceeds a predetermined amount.

Third Embodiment

A third embodiment will be described. The document understanding support apparatus 100 of this embodiment verifies learning data that has already been learned. More specifically, it is confirmed whether extracted words and extracted word relationships obtained when a learning document that has already been learned and stored in the storage 130 is used as a target document match extraction target words and extraction target word relationships corresponding to the learning document.

Even when the same learning document is used, words and word relationships to be extracted may change with the passage of time. Therefore, if learning is continued using the past learning data, the accuracy of the extraction conditions may decrease. Hence, the document understanding support apparatus 100 of this embodiment verifies a past learning document. When it is found that the past learning data is not suitable, it is possible to output the verification result and urge the user to correct or delete the past learning data.

Figure 17:
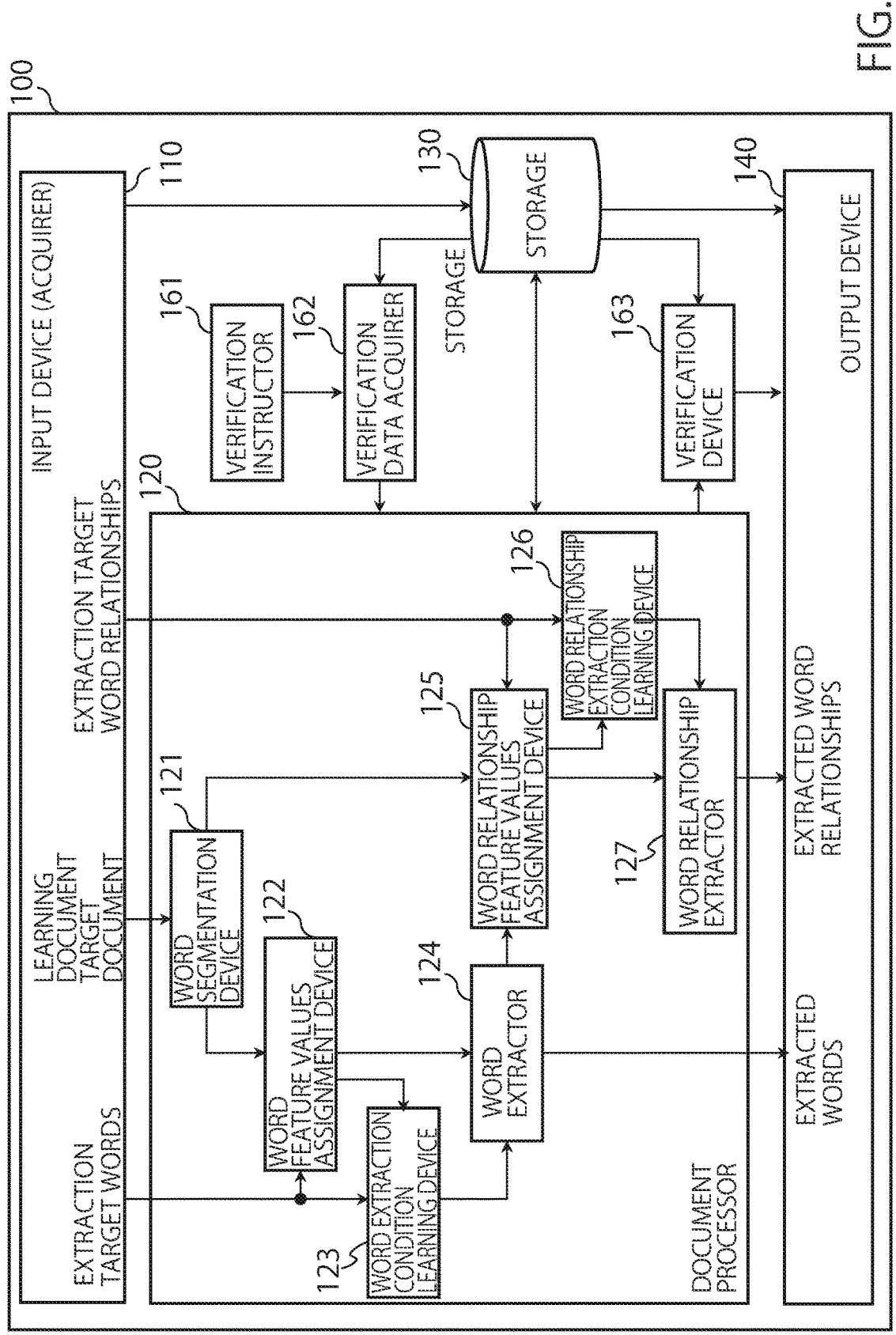
FIG. 17 is a block diagram illustrating an example of a schematic configuration of a document understanding support apparatus according to a third embodiment.

FIG. 17 is a block diagram illustrating an example of a schematic configuration of a document understanding support apparatus according to the third embodiment. In the third embodiment, the document understanding support apparatus 100 according to the previous embodiments further includes a verification instructor 161, a verification data acquirer 162, and a verification device 163. The third embodiment is different from the previous embodiments on this point. Descriptions of the same points as in the previous embodiments are omitted.

The verification instructor 161 instructs the verification data acquirer 162 to perform verification. The timing at which the verification instructor 161 instructs the verification process may be determined in advance depending on time, etc. For example, verification may be instructed when a predetermined period has elapsed since the learning process was performed. Alternatively, it is possible to determine in advance a rule that instructs once a month to verify the learning performed half a year ago. Alternatively, after relearning is performed in the second embodiment, verification may be instructed to confirm the effect of the relearning.

The verification data acquirer 162 acquires verification data for use in verification from the storage 130. Here, it is assumed that a learning document that has already been learned and recorded in the storage 130 is acquired and sent to the document processor 120 as a target document. Which learning document to acquire may be predetermined or may be instructed from the verification instructor 161. The document processor 120 performs the support process on the learned learning document. The contents of the support process are the same as those of the previous embodiments.

The verification device 163 compares the extracted words and the extracted word relationships extracted with respect to the learned learning document with the extraction target words and the extraction target word relationships corresponding to the learned learning document. Then, a verification result is generated. The verification result may be determined according to the number of different words and word relationships found by the comparison. For example, it is determined that the verification result is "good" when the number of different words and word relationships does not exceed a predetermined number, and the verification result is "bad" when the number exceeds the predetermined number.

The output device 140 outputs the verification result by the verification device 163. The outputting is performed in the same manner as in the previous embodiments.

Figure 18:
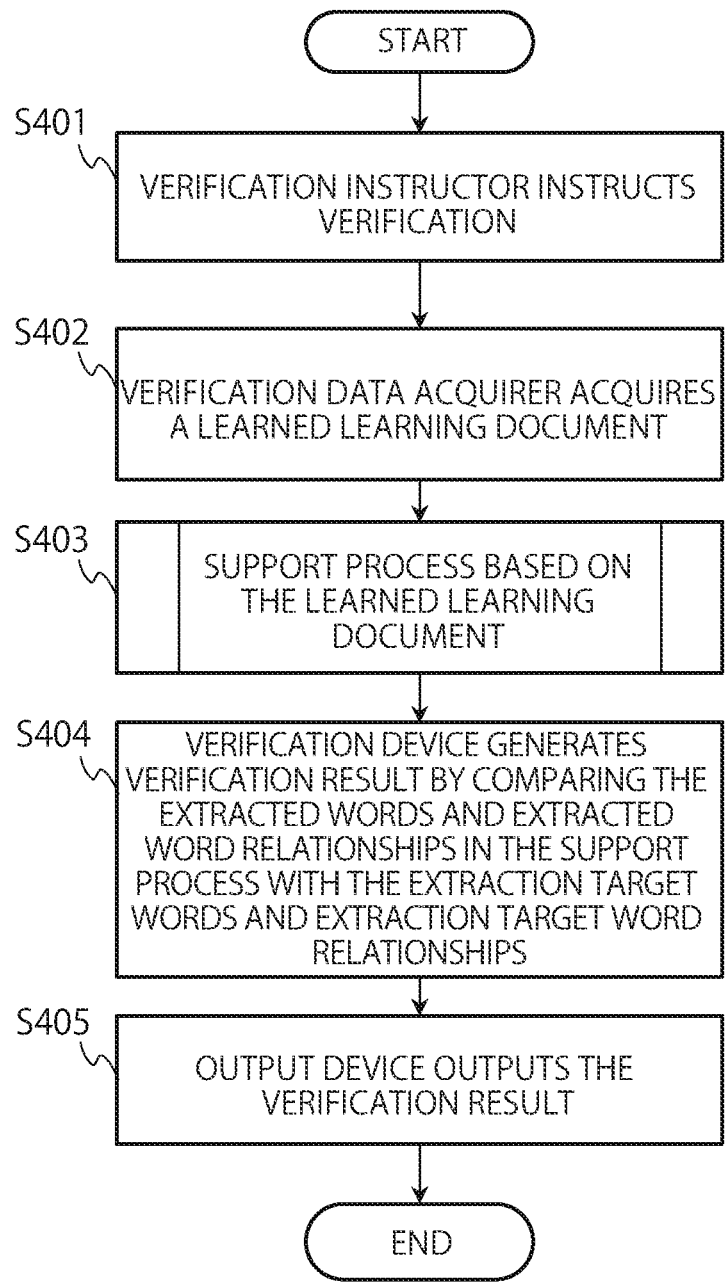
FIG. 18 is a diagram illustrating an example of a schematic flowchart of a verification process.

Next, the flow of the verification process will be described. FIG. 18 is a diagram illustrating an example of a schematic flowchart of the verification process.

The verification instructor 161 instructs the verification data acquirer 162 to perform verification (S401). The verification data acquirer 162 acquires a learning document that has already been learned from the storage 130 (S402).

The learned learning document is sent to the document processor 120 as a target document, and the document processor 120 performs a support process, on the basis of the learned learning document (S403). The contents of the support process are the same as those in the previous embodiments. Then, the verification device compares the extracted words and extracted word relationships in the support process with the extraction target words and the extraction target word relationships, and generates a verification result (S404). Finally, the output device 140 outputs the verification result (S405), and the flow ends.

As described above, according to this embodiment, by determining and outputting a difference between the current and past processing results, it is possible to facilitate the user to recognize the difference between the current and past processing results and edit the learning data, etc.

In addition, each of the processes in the above-described embodiments may be realized by an exclusive circuit or may be realized using software (program). In the case of using software (program), it is possible to realize the above-described embodiments by using a general-purpose computer as basic hardware and executing the program by a processor such as a central processing unit (CPU) mounted in the computer.

Figure 19:
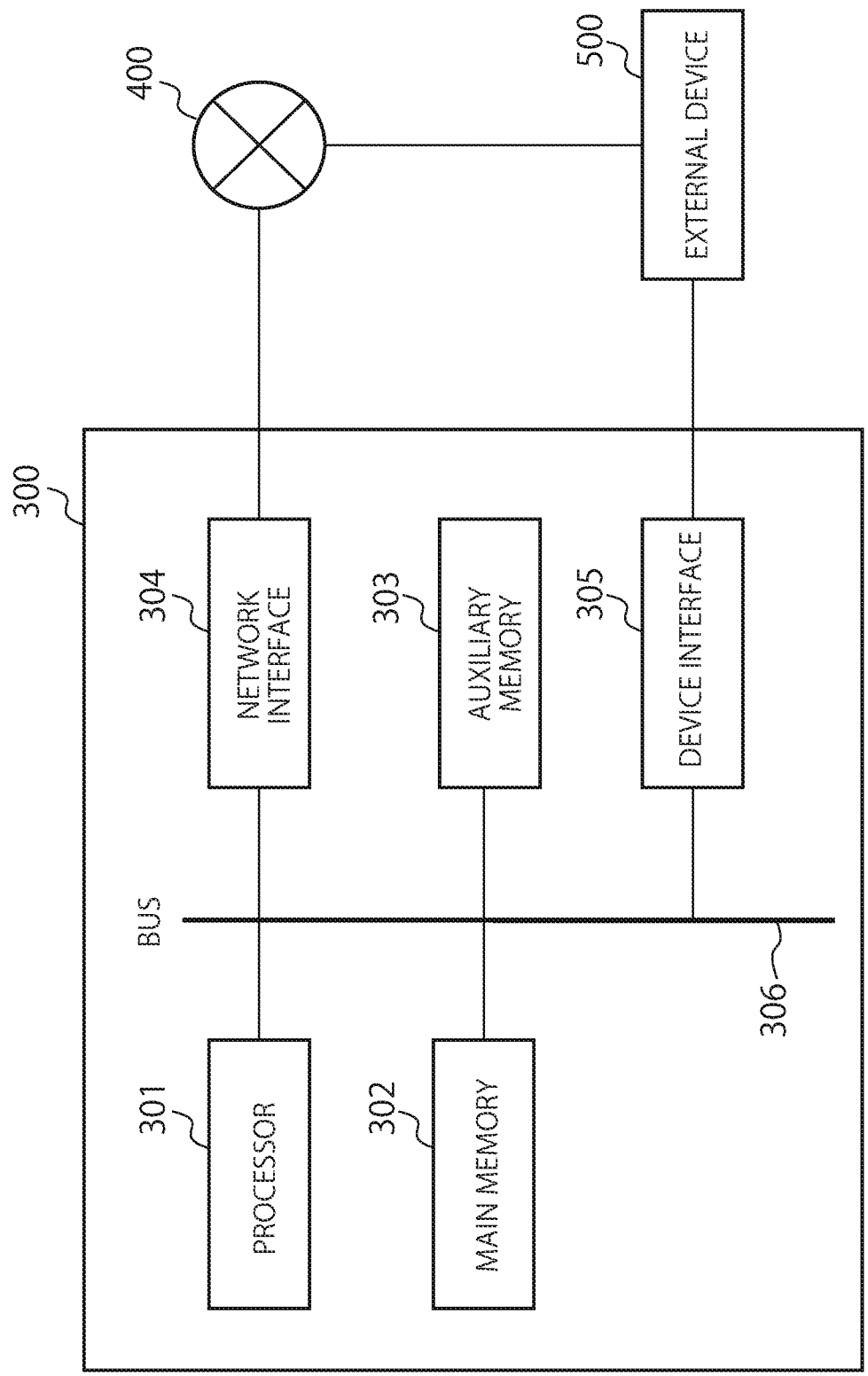
FIG. 19 is a block diagram illustrating an example of a hardware configuration according to an embodiment of the present invention.

FIG. 19 is a block diagram illustrating an example of a hardware configuration according to an embodiment of the present invention. The document understanding support apparatus 100 includes a processor 301, a main memory 302, an auxiliary memory 303, a network interface 304, and a device interface 305. These devices are connected through a bus 306 to realize a computer 300.

The document understanding support apparatus 100 according to this embodiment may be realized by preinstalling in the computer 300 a program to be executed. Alternatively, the document understanding support apparatus 100 may be realized by installing at any time in the computer 300 a program stored in a recording medium such as a CD-ROM readable by the computer 300, or a program distributed through a network.

In FIG. 19, the computer includes one each of the respective components, but the computer may have two or more of the same components. In addition, although one computer is illustrated in FIG. 19, software may be installed in a plurality of computers. Each of the plurality of computers may execute a different part of processing of the software to generate the processing result. In other words, the document understanding support apparatus 100 may be configured as a system.

The processor 301 is an electronic circuit including a control device and an arithmetic device of the computer. The processor 301 performs arithmetic processing on the basis of data and programs input from the respective devices in the internal configuration of the computer 300, and outputs arithmetic results and control signals to the respective devices. More specifically, the processor 301 executes an OS (operating system) of the computer 300, applications, etc., and controls the respective devices constituting the computer 300.

The processor 301 is not particularly limited as long as it can perform the above processing. The processor 301 may be, for example, a general-purpose processor, a central processing unit (CPU), a microprocessor, a digital signal processor (DSP), a controller, a microcontroller, a state machine, etc. The processor 301 may be incorporated in an application specific integrated circuit, a field programmable gate array (FPGA), or a programmable logic device (PLD). Further, the processor 301 may be composed of a plurality of processors. For example, the processor 301 may be a combination of a DSP and a microprocessor, or may be one or more microprocessors working with a DSP core.

The main memory 302 is a storage device that stores instructions to be executed by the processor 301, various types of data, etc. The information stored in the main memory 302 is directly read out by the processor 301. The auxiliary memory 303 is a storage device other than the main memory 302. Incidentally, the storage device means any electronic component capable of storing electronic information. As the main memory 302, a volatile memory which is used for storing temporary information, such as RAM, DRAM, or SRAM, is mainly used. However, in the embodiment of the present invention, the main memory 302 is not limited to such volatile memory. Storage devices to be used as the main memory 302 and the auxiliary memory 303 may be volatile memory or nonvolatile memory. The nonvolatile memory may be programmable read only memory (PROM), erasable programmable read only memory (EPROM), electrically erasable PROM (EEPROM), nonvolatile random access memory (NVRAM), flash memory, MRAM, etc. A magnetic or optical data storage device may be used as the auxiliary memory 303. As the data storage device, a magnetic disk such as a hard disk; an optical disk such as a DVD; a flash memory such as a USB; a magnetic tape, etc. may be used.

Incidentally, if the processor 301 directly or indirectly reads or writes, or reads and writes information from or to the main memory 302 or the auxiliary memory 303, it can be said that the storage device electrically communicates with the processor. Incidentally, the main memory 302 may be integrated into the processor. In this case, it can also be said that the main memory 302 electrically communicates with the processor.

The network interface 304 is an interface for connecting to a communication network 400 wirelessly or by wire. As the network interface 304, it is possible to use one complying with existing communication standards. With the network interface 304, output results may be transmitted to an external device 500 communicably connected through the communication network 400.

The device interface 305 is an interface such as a USB connected to the external device 500 that records the output results. The external device 500 may be an external storage medium or storage such as a database. The external storage medium may be an arbitrary recording medium, such as HDD, CD-R, CD-RW, DVD-RAM, DVD-R, and SAN (Storage Area Network).

The external device 500 may be an output device. For example, the external device 500 may be a display device for displaying an image, or a device for outputting sound, etc. Examples include, but not limited to, an LCD (Liquid Crystal Display), a CRT (Cathode Ray Tube), a PDP (Plasma Display Panel), and a speaker, etc.

The external device 500 may be an input device. The input device includes devices such as a keyboard, a mouse, and a touch panel, and supplies information input by these devices to the computer 300. A signal from the input device is output to the processor 301.

A part or the whole of the computer 300, that is, a part or the whole of the document understanding support apparatus 100 may be constituted by an exclusive electronic circuit (that is, hardware) such as a semiconductor integrated circuit on which the processor 301, etc. are mounted. The exclusive hardware may be configured in combination with a storage device, such as RAM and ROM.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A document understanding support apparatus comprising:
    a word extraction condition learning device configured to create a word extraction condition for extracting words from a target electronic document by machine-learning based on extraction target words in a learning electronic document and feature values assigned to the respective words in the learning electronic document;
    a word extraction device configured to extract words satisfying the word extraction condition among words in the target electronic document on the basis of feature values assigned to the respective words in the target electronic document;

a word relationship extraction condition learning device configured to create a word relationship extraction condition for extracting word relationships from the target electronic document by learning based on extraction target word relationships in the learning electronic document and feature values assigned to the respective word relationships in the learning electronic document;

a word relationship extraction device configured to extract a word relationship that is established by words satisfying the word extraction condition and satisfies the word relationship extraction condition, on the basis of feature values assigned to word relationships established by words satisfying the word extraction condition;

an output device configured to output at least either the extracted words or the extracted word relationship;

a storage configured to store extraction target words and the extraction target word relationships as learning data;

a learning data recorder configured to record extracted words and extracted word relationships as the extraction target words and the extraction target word relationships in the storage; and a learning data editor configured to edit the extraction target words and the extraction target word relationships stored in the storage on the basis of edited data, wherein the word extraction condition learning device and the word relationship extraction condition learning device perform relearning based on the edited extraction target words or extraction target word relationships, and update the word extraction condition or the word relationship extraction condition.

2. The document understanding support apparatus according to claim 1, further comprising a relearning instruction device configured to instruct at least either the word extraction condition learning device or the word relationship extraction condition learning device to perform the relearning at least at either a predetermined time, a timing at which the learning data was edited, a timing at which the number of times the learning data was edited exceeded a predetermined number of times, or a timing at which an amount of the edited learning data exceeded a predetermined amount.

3. The document understanding support apparatus according to Claim 1, wherein:
the extracted words include at least an object to be processed and a content of process;
relations about the extracted word relationships include at least a process relationship and a before-after relationship;
the output device displays the extracted words in a tree structure on the basis of the extracted word relationships; and
the tree structure indicates the words in the order of objects to be processed, or in the order of processes.

4. The document understanding support apparatus according to Claim 1, further comprising:
an acquisition device configured to acquire the target electronic document;
a word segmentation device configured to separate a character string in the target electronic document into words;
a word feature values assignment device configured to assign to each word in the target electronic document feature values corresponding to the word; and a word relationship feature values assignment device configured to assign feature values corresponding to the word relationship between words satisfying the word extraction condition to the word relationship.

5. The document understanding support apparatus according to claim 4, wherein:
the output device outputs a user interface that displays the extracted words or the extracted word relationships; and
the acquirer acquires the extraction target words or the extraction target word relationships through the user interface.

6. The document understanding support apparatus according to Claim 4, further comprising a verification device configured to verify respectively whether words and word relationships extracted by using a learned learning electronic document as a target electronic document match the extraction target words and the extraction target word relationships corresponding to the learned learning electronic document, wherein the output device outputs a result of the verification.

7. The document understanding support apparatus according to claim 4, wherein:
the acquirer receives a first identifier for identifying a determination item list for assigning feature values; and
the word feature values assignment device and the word relationship feature values assignment device assign feature values using a determination item list corresponding to a value of the first identifier among a plurality of the determination item lists.

8. The document understanding support apparatus according to claim 4, wherein:
the acquirer receives a second identifier;
the word extraction condition learning device and the word relationship extraction condition learning device create respectively the word extraction condition and the word relationship extraction condition, for each value of the second identifier;
the word extractor extracts a word satisfying the word extraction condition corresponding to the value of the second identifier when the second identifier is specified; and
the word relationship extractor extracts a word relationship satisfying the word relationship extraction condition corresponding to the value of the second identifier when the second identifier is specified.

9. A document understanding support method comprising:
creating a word extraction condition for extracting words from a target electronic document by first learning based on extraction target words in a learning electronic document and feature values assigned to the respective words in the learning electronic document;
extracting words satisfying the word extraction condition among words in the target electronic document on the basis of feature values assigned to the respective words in the target electronic document;
creating a word relationship extraction condition for extracting a word relationship from the target electronic document by second learning based on extraction target word relationships in the learning electronic document and feature values assigned to the respective word relationships in the learning electronic document;
extracting a word relationship that is established by words satisfying the word extraction condition and satisfies the word relationship extraction condition, on the basis of feature values assigned to word relationships established by words satisfying the word extraction condition;
outputting at least either the extracted words or the extracted word relationship;
storing extraction target words and the extraction target word relationships as learning data in a storage;
recording extracted words and extracted word relationships as the extraction target words and the extraction target word relationships in the storage;
editing the extraction target words and the extraction target word relationships stored in the storage on the basis of edited data;
performing relearning of the first learning or the second learning based on the edited extraction target words or extraction target word relationships; and
updating the word extraction condition or the word relationship extraction condition.

10. A non-transitory storage medium storing a program for causing a computer to execute:
creating a word extraction condition for extracting words from a target electronic document by first learning based on extraction target words in a learning electronic document and feature values assigned to the respective words in the learning electronic document;
extracting words satisfying the word extraction condition among words in the target electronic document on the basis of feature values assigned to the respective words in the target electronic document;
creating a word relationship extraction condition for extracting a word relationship from the target electronic document by second learning based on extraction target word relationships in the learning electronic document and feature values assigned to the respective word relationships in the learning electronic document;
extracting a word relationship that is established by words satisfying the word extraction condition and satisfies the word relationship extraction condition, on the basis of feature values assigned to word relationships established by words satisfying the word extraction condition;
outputting at least either the extracted words or the extracted word relationship;
storing extraction target words and the extraction target word relationships as learning data in a storage;
recording extracted words and extracted word relationships as the extraction target words and the extraction target word relationships in the storage;
editing the extraction target words and the extraction target word relationships stored in the storage on the basis of edited data;
performing relearning of the first learning or the second learning based on the edited extraction target words or extraction target word relationships; and
updating the word extraction condition or the word relationship extraction condition.

* * * * *